US011397239B2

(12) United States Patent
Jungmaier et al.

(10) Patent No.: US 11,397,239 B2
(45) Date of Patent: Jul. 26, 2022

(54) RADAR SENSOR FSM LOW POWER MODE

(71) Applicant: Infineon Technologies AG, Neubiberg (DE)

(72) Inventors: Reinhard-Wolfgang Jungmaier, Alkoven (AT); Christoph Rumpler, Munich (DE); Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 340 days.

(21) Appl. No.: 16/584,296

(22) Filed: Sep. 26, 2019

(65) Prior Publication Data

US 2020/0132808 A1     Apr. 30, 2020

Related U.S. Application Data

(60) Provisional application No. 62/749,956, filed on Oct. 24, 2018.

(51) Int. Cl.
    *G01S 7/35*     (2006.01)
(52) U.S. Cl.
    CPC ..................................... *G01S 7/35* (2013.01)
(58) Field of Classification Search
    CPC ... G01S 7/03; G01S 7/35; G01S 13/02; G01S 13/26; G01S 13/32; G01S 13/88; G01S 13/343
    See application file for complete search history.

(56) References Cited

U.S. PATENT DOCUMENTS

| | | | |
|---|---|---|---|
| 4,241,347 A | 12/1980 | Albanese et al. |
| 6,147,572 A | 11/2000 | Kaminski et al. |
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Milliken, R., Silva-Martinez, J., & Sanchez-Sinencio, E. (2007). Full On-Chip CMOS Low-Dropout Voltage Regulator. IEEE Transactions on Circuits and Systems I: Regular Papers, 54(9), 1879-1890. doi: 10.1109/tcsi.2007.902615 (Year: 2007).*

(Continued)

*Primary Examiner* — Vladimir Magloire
*Assistant Examiner* — Oladimeji Oyegunle
(74) *Attorney, Agent, or Firm* — Slater Matsil, LLP (57) ABSTRACT

In an embodiment, a method of operating a radar includes: transmitting a radiation pulse with the radar during an active mode; asserting a sleep flag after transmitting the radiation pulse; turning off a crystal oscillator circuit of the radar after the sleep flag is asserted; clocking a counter of the radar with a low power oscillator during a low power mode after the sleep flag is asserted; asserting a timer flag when the counter reaches a first threshold; and transitioning into the active mode after the timer flag is asserted.

22 Claims, 2 Drawing Sheets

(56) References Cited

U.S. PATENT DOCUMENTS

| | | | |
|---|---|---|---|
| 7,454,634 B1* | 11/2008 | Donovan | H04W 52/029 713/322 |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,825,587 B1* | 11/2017 | Kirschner | H03B 5/32 |
| 9,886,095 B2 | 2/2018 | Pothier | |
| 9,935,065 B1 | 4/2018 | Baheti et al. | |
| 10,097,283 B1* | 10/2018 | Yeager | H03L 1/00 |
| 10,914,834 B2* | 2/2021 | Amihood | G01S 13/582 |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187401 A1 | 6/2016 | Altus et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |
| 2018/0113196 A1 | 4/2018 | Subburaj et al. | |
| 2018/0175905 A1 | 6/2018 | Nabki et al. | |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |

(56) References Cited

FOREIGN PATENT DOCUMENTS

| WO | 2013009473 A2 | 1/2013 |
|---|---|---|
| WO | 2016033361 A1 | 3/2016 |

OTHER PUBLICATIONS

Tanis, S., "Automotive Radar Sensors and Congested Radio Spectrum: An Urban Electronic Battlefield?", Analog Dialogue 52-07, Jul. 2018, 5 pages.

Wikipedia, "Barker Code", https://en.wikipedia.org/wiki/Barker_code, Oct. 19, 2018, 3 pages.

Infineon, BGT24MTR11, "Using BGT24MTR11 in Low Power Applications", RF and Protection Devices, 24 GHz Radar, Application Note AN341, Revision: Rev. 1.0, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler MultiRadar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi: 10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Wikipedia, "Monopulse Radar", https://en.wikipedia.org/wiki/Monopulse_radar, Sep. 3, 2018, 6 pages.

Wikipedia, "Phase-comparison monopulse", https://en.wikipedia.org/wiki/Phase-comparison_monopulse, Sep. 3, 2018, 3 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Dham, V., Texas Instruments, "Programming Chirp Parameters in TI Radar Devices", Application Report SWRA553—May 2017, 15 pages.

Killedar, A., "XWRIxxx Power Management Optimizations—Low Cost LC Filter Solution", Application Report, SWRA577—Oct. 2017, 19 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

\* cited by examiner

RADAR SENSOR FSM LOW POWER MODE

CROSS-REFERENCE TO RELATED APPLICATIONS

This application claims the benefit of U.S. Provisional Application No. 62/749,956, filed on Oct. 24, 2018, which application is hereby incorporated herein by reference.

TECHNICAL FIELD

The present invention relates generally to an electronic system and method, and, in particular embodiments, to a radar sensor finite state machine (FSM) low power mode.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

Radar devices include a power management circuit to provide power for the radar. Power management circuits typically have direct impact on, for example, performance, safety, and power consumption metrics of the radar. In many applications, it is desirable to achieve low power consumption without sacrificing other metrics, such as safety and performance.

A power management circuit typically includes one or more regulators, such as low dropout regulators (LDOs), and/or switching regulators. During normal operation, the power management circuit typically includes at least one active mode in which the radar is fully operational, and a low power mode in which one or more blocks of the system are turned off when the radar is not in use.

SUMMARY

In accordance with an embodiment, a method of operating a radar includes: transmitting a radiation pulse with the radar during an active mode; asserting a sleep flag after transmitting the radiation pulse; turning off a crystal oscillator circuit of the radar after the sleep flag is asserted; clocking a counter of the radar with a low power oscillator during a low power mode after the sleep flag is asserted; asserting a timer flag when the counter reaches a first threshold; and transitioning into the active mode after the timer flag is asserted.

In accordance with an embodiment, a radar includes a crystal oscillator circuit, a low power oscillator circuit, a counter, and a finite state machine. The crystal oscillator circuit is configured to be coupled to an external crystal and is configured to generate a first clock signal. The low power oscillator circuit is configured to generate a second clock signal. The counter is coupled to the crystal oscillator circuit and to the low power oscillator circuit. The finite state machine is configured to: cause the radar to transmit a radiation pulse during an active mode, assert a sleep flag after transmitting the radiation pulse, turn off the crystal oscillator circuit after the sleep flag is asserted, clock the counter with the second clock signal during a low power mode after the sleep flag is asserted, assert a timer flag when the counter reaches a threshold, and cause the radar to transition to the active mode when the timer flag is asserted.

In accordance with an embodiment, a millimeter-wave radar includes a transmitting antenna, a crystal oscillator circuit, a low power oscillator circuit, a low power regulator, a multiplexer, a counter, and a finite state machine. The transmitting antenna is configured to transmit a chirp during an active mode. The crystal oscillator circuit is configured to be coupled to an external crystal and is configured to generate a first clock signal having a first frequency. The low power oscillator circuit is configured to generate a second clock signal having a second frequency lower than the first frequency. The low power regulator is configured to provide power to the low power oscillator circuit. The multiplexer has a first input coupled to the crystal oscillator circuit, and a second input coupled to the low power oscillator circuit. The counter has an input coupled to an output of the multiplexer. The finite state machine is configured to: assert a sleep flag after transmitting the chirp, turn off the crystal oscillator circuit and a clock path associated with the crystal oscillator circuit after the sleep flag is asserted, select the low power oscillator circuit for clocking the counter after the sleep flag is asserted using the multiplexer, clock the counter with the low power oscillator circuit during a low power mode, assert a timer flag when the counter reaches a threshold, and cause the millimeter-wave radar to transition to the active mode when the timer flag is asserted.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, an FSM low power mode for a millimeter-wave radar. Embodiments of the present invention may be used in other types of radars, such as radars different than millimeter-wave radars, for example.

In an embodiment of the present invention, a millimeter-wave radar is operated in a duty-cycling mode in which radar measurements are conducted in short intervals separated by sleep intervals in which the millimeter-wave radar is in low-power mode. In low power mode, a low power oscillator clocks a counter used to wake up the millimeter-wave radar such that the millimeter-wave radar performs the next set of radar measurements.

Figure 1:
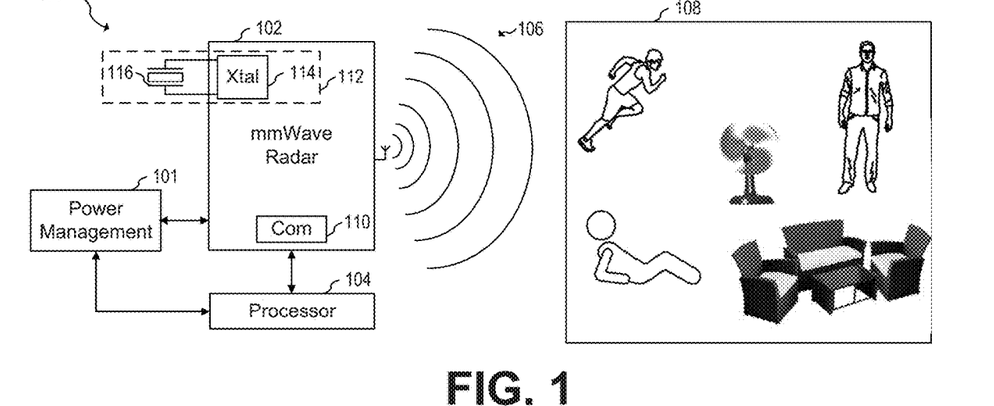
FIG. 1 shows a radar system, according to an embodiment of the present invention.

Millimeter-wave radars may be used, for example, to detect moving or static objects in a field of view. For example, FIG. 1 shows millimeter-wave radar system 100, according to an embodiment of the present invention. Radar system 100 includes millimeter-wave radar 102, processor 104, and power management circuit 101.

During normal operation, millimeter-wave radar 102 transmits a plurality of radiation pulses 106, such as chirps, towards scene 108. The transmitted radiation pulses 106 are reflected by objects in scene 108. The reflected radiation pulses (not shown in FIG. 1), which are also referred to as the echo signal, are detected by millimeter-wave radar 102 and processed by processor 104 to, for example, detect location, Doppler velocity, and other characteristics of objects in scene 108.

Millimeter-wave radar 102 operates as a frequency-modulated continuous wave (FMCW) radar or pulsed Doppler radar that includes a millimeter-wave radar sensor circuit, a transmitting antenna(s), and a receiving antenna(s). Millimeter-wave radar 102 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, millimeter-wave radar 102 uses crystal oscillator 112 as a clock reference to operate. Crystal oscillator includes crystal circuit 114 and external crystal 116. In some embodiments, crystal oscillator 112 operates at 80 MHz. Other frequencies may also be used.

In some embodiments, the echo signals received by the receiving antennas of millimeter-wave radar 102 are filtered and amplified using band-pass filter (BPFs), low-pass filter (LPFs), mixers, low-noise amplifier (LNAs), and intermediate frequency (IF) amplifiers in ways known in the art by, e.g., millimeter-wave radar 102. The echo signals are then digitized using one or more analog-to-digital converters (ADCs) for further processing, e.g., by processor 104. Other implementations are also possible.

In some embodiments, millimeter-wave radar 102 communicates with processor 104 using communication interface no. Communication interface no may be, for example, of the serial peripheral interface (SPI), inter-integrated circuit ($I^2C$), or universal asynchronous receiver-transmitter (UART) type. Other communication interfaces may be used.

Processor 104 may be implemented as a general purpose processor, controller or digital signal processor (DSP) that includes, for example, combinatorial circuits coupled to a memory. In some embodiments, processor 104 may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. For example, some embodiments may be implemented using software running in a general purpose micro-controller or processor having, for example, a CPU coupled to a memory and implemented with an ARM or x86 architecture. Some embodiments may be implemented as a combination of hardware accelerator(s) and software running on a DSP or general purpose micro-controller.

Power management circuit 101 includes one or more power regulators, such as an LDO or a DC/DC switching converter, for example, and provides power to millimeter-wave radar 102. In some embodiments, power management circuit 101 also provides power to additional circuitry, such as processor 104, for example.

Figure 2:
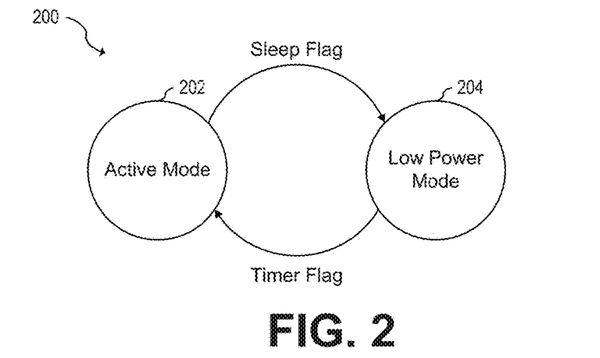
FIG. 2 shows a state diagram of duty-cycling of the millimeter-wave radar system of FIG. 1, according to an embodiment of the present invention.

Some embodiments operate millimeter-wave radar 102 by periodically cycling between active mode and low power mode to, e.g., reduce power consumption. For example, FIG. 2 shows state diagram 200 of duty-cycling of millimeter-wave radar system 100, according to an embodiment of the present invention.

During active mode 202, millimeter-wave radar 102 transmits radiation pulses 106 and receives corresponding reflected radiation pulses. Crystal oscillator 112 is used as a reference for the transmitting and receiving of the radiation pulses.

Once millimeter-wave radar 102 finishes transmitting and receiving the radiation pulses, a sleep flag is asserted (e.g., transition from an inactive state, e.g., low, into an active state, e.g., high) to signal that millimeter-wave radar 102 is idle. The sleep flag may be a bit in a register, a signal, or some other flag.

When the sleep flag is asserted, millimeter-wave radar 102 transitions into low power mode 204. In low power mode 204, most of the blocks of millimeter-wave radar 102 are turned off or into low power mode to, e.g., reduce power consumption. Some blocks, however, may remain operational. For example, in an embodiment implementing communication interface no with as an SPI interface, the SPI interface may remain on during low power mode.

When a timer flag is asserted, millimeter-wave radar 102 wakes up from low power mode into active mode, repeating the sequence.

Figure 3:
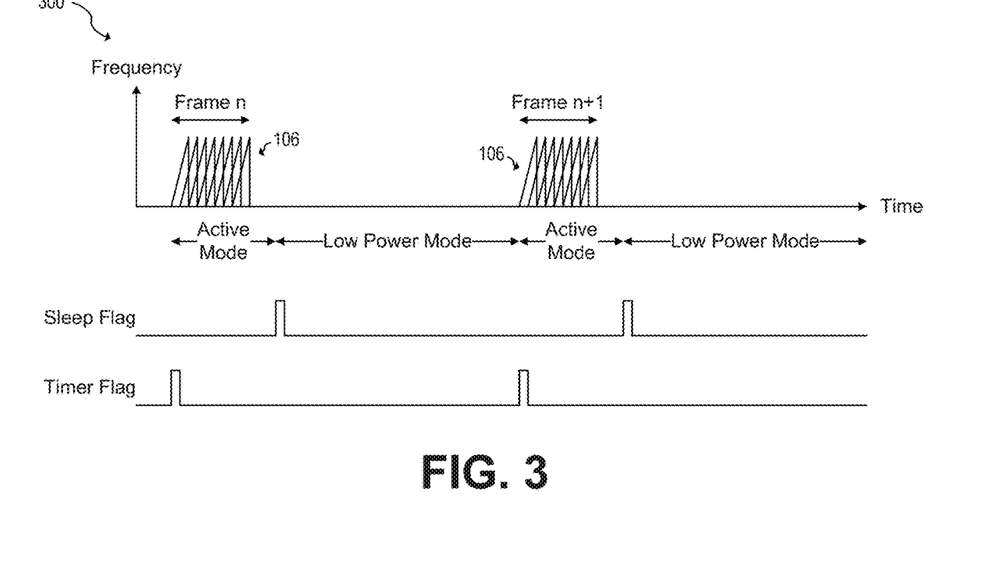
FIG. 3 shows a graph illustrating the transmission of radiation pulses as the millimeter-wave radar system of FIG. 1 transitions between an active mode and a low power mode, according to an embodiment of the present invention.

FIG. 3 shows graph 300 illustrating the transmission of radiation pulses 106 as millimeter-wave radar system 100 transitions between active mode 202 and low power mode 204, according to an embodiment of the present invention. As shown in FIG. 3, radiation pulses are transmitted and received during short intervals, separated by sleep times in which millimeter-wave radar 102 is in low power mode. During each active mode time, a frame of p radiation pulses (e.g., chirps, such as linear chirps) is transmitted. In some embodiments, p is equal to 1. In other embodiments, p is greater than 1, such as 8, 16, 32, etc.

In some embodiments, millimeter-wave radar 102 is in active mode lower than 10% of the time (i.e., a duty cycle of lower than 10%). For example, in some embodiments, millimeter-wave radar 102 is in active mode 2% of the time, and in low power mode 98% of the time. For example, millimeter-wave radar 102 may be in active mode 10 ms every 500 ms.

In some embodiments, the timer flag generation relies on a counter (timer) that expires after, e.g., a predetermined time. Since crystal oscillator 112 may consume a significant amount of power (e.g., 3-4 mW for 80 MHz operation), millimeter-wave radar 102 keeps crystal oscillator 112 off during low power mode. A conventional system, therefore, implements the counter in processor 104, and uses SPI to wake up millimeter-wave radar 102 when the counter in processor 104 expires.

In an embodiment of the present invention, an FSM uses a low power oscillator inside the millimeter-wave radar to clock a counter during low power mode. The counter produces the timer flag based on the low power oscillator. The FSM uses the crystal oscillator to clock the counter during active mode. In some embodiments, the low power oscillator operates at a lower frequency than the crystal oscillator. In such embodiments, a multiplier may be used to cause the counter to produce equivalent time measurements during active mode and low power mode.

Figure 4:
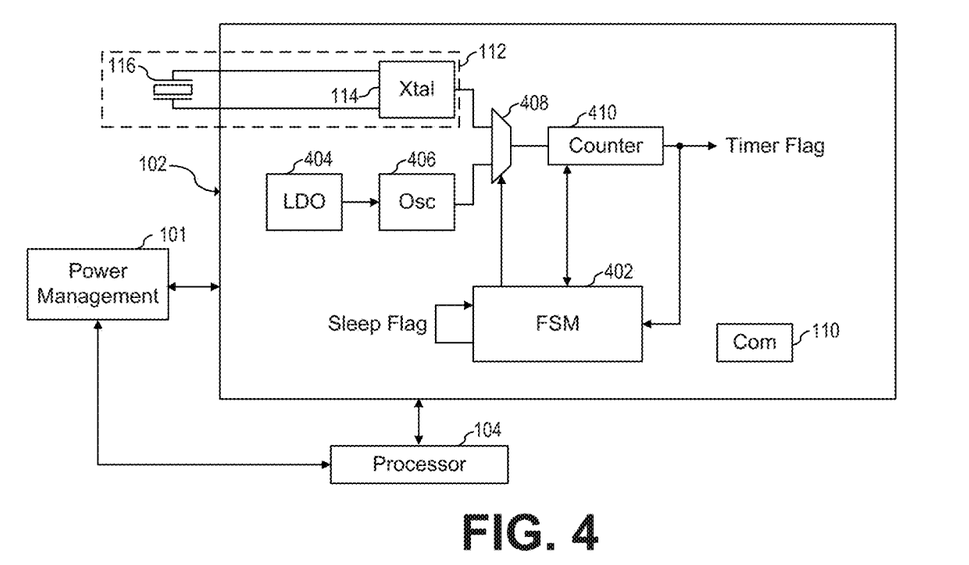
FIG. 4 shows a schematic diagram of the millimeter-wave radar of FIG. 1, according to an embodiment of the present invention.
Figure 5:
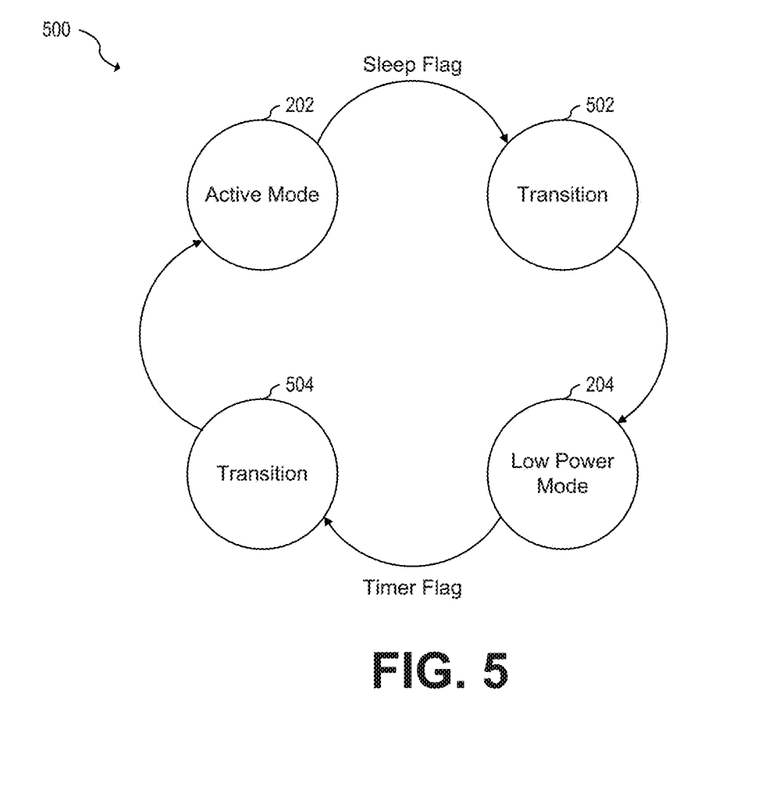
FIG. 5 shows a state diagram illustrating the state transitions of an FSM of the millimeter-wave radar of FIG. 1 between an active mode and a low power mode, according to an embodiment of the present invention.

FIG. 4 shows a schematic diagram of millimeter-wave radar 102, according to an embodiment of the present invention. FIG. 5 shows state diagram 500 of FSM 402, illustrating the state transitions of millimeter-wave radar 102 between active mode 202 and low power mode 204, according to an embodiment of the present invention. FIG. 4 may be understood in view of FIG. 5.

As shown in FIG. 4, millimeter-wave radar 102 further includes FSM 402, low power LDO 404, low power oscillator 406, multiplexer (MUX) 408, and counter 410. In active mode 202, crystal oscillator 112 is used to clock counter 410, for example, by FSM 402 selecting the input of MUX 408 associated with crystal oscillator 112. Counter 410 may clock at the speed of crystal oscillator 112 during active mode. In some embodiments, counter 410 may clock at a lower speed than crystal oscillator 112, for example, by using a clock divider.

After millimeter-wave radar 102 finishes transmitting and receiving radiation pulses, the sleep flag is asserted. After the sleep flag is asserted, FSM 402 moves into transition state 502. In some embodiments, the sleep flag is asserted based on a time measured by counter 410 (e.g., the time associated for performing radar measurements may be predetermined). For example, in some embodiments, the sleep flag is asserted when the counter reaches a predetermined threshold, e.g., that is associated to the time for performing radar measurements. In other embodiments, millimeter-wave radar 102 may asynchronously signal that is ready to transition into low-power mode.

During transition state 502, crystal oscillator 112 is turned off, e.g., to reduce power consumption, and FSM 402 selects, using MUX 408, low power oscillator 406 to clock counter 410. Other blocks of millimeter-wave radar 102 (not shown in FIG. 4) may be turned off during transition state 502. After transition state 502, FSM 402 moves into low power mode. In some embodiments, the clock path associated with the signal generated by crystal oscillator 112 is also turned off when crystal oscillator 112 is turned off. For example, in some embodiments, crystal circuit 114 and other switching elements in the signal path of the signal generated by crystal oscillator 112 are turned off and/or stop switching during transition state 502.

In low power mode 204, low power oscillator 406 is used to clock counter 410, for example, by FSM 402 selecting the input of MUX 408 associated with low power oscillator 406. Counter 410 may clock at the speed of low power oscillator 406 during low power mode. In some embodiments, counter 410 may count at a higher speed than low power oscillator 406, for example, by using a clock multiplier (e.g., using digital multiplication). For example, in some embodiments, each clock of low power oscillator 406 may cause counter 410 to advance L counts, where L is the multiplication factor. In some embodiments, L may be, for example, $$L = \frac{f_{xtal}}{f_{osc}},$$

where $f_{xtal}$ is the frequency of crystal oscillator 112, and $f_{osc}$ is the frequency of low power oscillator 406. When the timer expires (e.g., when counter 410 reaches a predetermined threshold), a timer flag is asserted. When the timer flag is asserted, FSM 402 moves into transition state 504.

During transition state 504, many blocks of millimeter-wave radar 102 are turned on, such as crystal oscillator 112. FSM 402 selects, using MUX 408, crystal oscillator 112 to clock counter 410. After transition state 504, FSM 402 moves into active mode, repeating the sequence.

Crystal oscillator 112 may be implemented in any way known in the art. Crystal oscillator 112 may operate, for example, at 80 MHz. Other frequencies may also be used.

Low power oscillator 406 may be implemented in any way known in the art. In some embodiments, low power oscillator 406 operates at a lower frequency than crystal oscillator 112. For example, low power oscillator 406 may operate at 300 kHz. Other frequencies may also be used.

In some embodiments, low power oscillator 406 is always on. In other embodiments, low power oscillator 406 may be off during active mode 202.

Low power LDO 404 may be implemented in any way known in the art. In some embodiments, low power LDO 404 may be an always-on LDO. In other embodiments, low power LDO may be off when not in used, e.g., during active mode.

FSM 402 controls the millimeter-wave radar operations during low power mode, as well as the duty-cycling between active mode and low power mode. In some embodiments FSM 402 may also control operations of millimeter-wave radar 102 during active mode. For example, in some embodiments, FSM 402 causes millimeter-wave radar 102 to transmit radiation pulses 106.

FSM 402 may be implemented by custom logic. Some embodiments may implement FSM 402 using a controller, such as an ARM core. Other implementations are also possible.

In some embodiments, implementing the counter inside the millimeter-wave radar and clocking it using a low power oscillator advantageously allows for low power operation without relying on an external controller (such as a processor) for wake-up commands. In some embodiments, autonomous operation of the millimeter-wave radar, therefore, advantageously allows for improved wake up timing. For example, a transition between low power mode and active mode may be timely achieved without relying in external commands (e.g., via SPI) that may be prone to delays. By improving timing, accuracy of radar measurements (e.g., measurements relying on multi-frame information) may also be improved while maintaining low power consumption.

Example embodiments of the present invention are summarized here. Other embodiments can also be understood from the entirety of the specification and the claims filed herein.

Example 1. A method of operating a radar, the method including: transmitting a radiation pulse with the radar during an active mode; asserting a sleep flag after transmitting the radiation pulse; turning off a crystal oscillator circuit of the radar after the sleep flag is asserted; clocking a counter of the radar with a low power oscillator during a low power mode after the sleep flag is asserted; asserting a timer flag when the counter reaches a first threshold; and transitioning into the active mode after the timer flag is asserted.

Example 2. The method of example 1, further including clocking the counter with the crystal oscillator circuit during the active mode.

Example 3. The method of one of examples 1 or 2, where asserting the sleep flag includes asserting the sleep flag when the counter reaches a second threshold.

Example 4. The method of one of examples 1 to 3, where clocking the counter during the low power mode includes performing a digital multiplication by a predetermined factor.

Example 5. The method of one of examples 1 to 4, where the predetermined factor is given by $$L = \frac{f_{xtal}}{f_{osc}},$$

where L is the predetermined factor, $f_{xtal}$ is a first frequency of the crystal oscillator circuit, and $f_{osc}$ is a second frequency of the low power oscillator.

Example 6. The method of one of examples 1 to 5, further including powering the low power oscillator with a low power linear dropout regulator.

Example 7. The method of one of examples 1 to 6, further including keeping the low power linear dropout regulator on during active mode.

Example 8. The method of one of examples 1 to 7, further including communicating with an external processor using a serial peripheral interface (SPI) interface.

Example 9. The method of one of examples 1 to 8, where a first frequency of the crystal oscillator circuit is higher than a second frequency of the low power oscillator.

Example 10. The method of one of examples 1 to 9, where the first frequency is about 80 MHz, and the second frequency is about 300 kHz.

Example 11. The method of one of examples 1 to 10, further including transmitting a plurality of radiation pulses during the active mode.

Example 12. The method of one of examples 1 to 11, where the radar is a millimeter-wave radar.

Example 13. The method of one of examples 1 to 12, where the millimeter-wave radar operates as a frequency-modulated continuous wave (FMCW) radar.

Example 14. The method of one of examples 1 to 13, where the radiation pulse includes a linear chirp.

Example 15. The method of one of examples 1 to 14, where a duty cycle of active mode operation of the radar is lower than 10%.

Example 16. The method of one of examples 1 to 15, where the duty cycle of active mode operation of the radar is about 2%.

Example 17. The method of one of examples 1 to 16, further including turning off a clock path associated with the crystal oscillator circuit when turning off the crystal oscillator.

Example 18. A radar including: a crystal oscillator circuit configured to be coupled to an external crystal, the crystal oscillator circuit configured to generate a first clock signal; a low power oscillator circuit configured to generate a second clock signal; a counter coupled to the crystal oscillator circuit and to the low power oscillator circuit; and a finite state machine configured to: cause the radar to transmit a radiation pulse during an active mode, assert a sleep flag after transmitting the radiation pulse, turn off the crystal oscillator circuit after the sleep flag is asserted, clock the counter with the second clock signal during a low power mode after the sleep flag is asserted, assert a timer flag when the counter reaches a threshold, and cause the radar to transition to the active mode when the timer flag is asserted.

Example 19. The radar of example 18, where the radar is a millimeter-wave radar operating as a frequency-modulated continuous wave (FMCW) radar.

Example 20. The radar of one of examples 18 or 19, further including: a communication interface configured to be coupled to an external controller; and a linear dropout regulator configured to provide power to the low power oscillator circuit.

Example 21. A millimeter-wave radar including: a transmitting antenna configured to transmit a radiation pulse during an active mode; a crystal oscillator circuit configured to be coupled to an external crystal, the crystal oscillator circuit configured to generate a first clock signal having a first frequency; a low power oscillator circuit configured to generate a second clock signal having a second frequency lower than the first frequency; a low power regulator configured to provide power to the low power oscillator circuit; a multiplexer having a first input coupled to the crystal oscillator circuit, and a second input coupled to the low power oscillator circuit; a counter having an input coupled to an output of the multiplexer; and a finite state machine configured to: assert a sleep flag after transmitting the radiation pulse, turn off the crystal oscillator circuit and/or a clock path associated with the crystal oscillator circuit after the sleep flag is asserted, select the low power oscillator circuit for clocking the counter after the sleep flag is asserted using the multiplexer, clock the counter with the low power oscillator circuit during a low power mode, assert a timer flag when the counter reaches a threshold, and cause the millimeter-wave radar to transition to the active mode when the timer flag is asserted.

Example 22. The millimeter-wave radar of example 21, further including the external crystal coupled to the crystal oscillator circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a radar, the method comprising:
transmitting a radiation pulse with the radar during an active mode;
asserting a sleep flag after transmitting the radiation pulse;
turning off a crystal oscillator circuit of the radar after the sleep flag is asserted, wherein a multiplexer comprises a first input coupled to the crystal oscillator circuit, and a second input coupled to a low power oscillator;
selecting the low power oscillator for clocking a counter after the sleep flag is asserted using the multiplexer, the counter having an input coupled to an output of the multiplexer;
clocking the counter of the radar with the low power oscillator during a low power mode after the sleep flag is asserted;
asserting a timer flag when the counter reaches a first threshold;
transitioning into the active mode after the timer flag is asserted; and
clocking the counter with the crystal oscillator circuit during the active mode.

2. The method of claim 1, wherein asserting the sleep flag comprises asserting the sleep flag when the counter reaches a second threshold.

3. The method of claim 1, wherein clocking the counter during the low power mode comprises performing a digital multiplication by a predetermined factor.

4. The method of claim 3, wherein the predetermined factor is given by $$L = \frac{f_{xtal}}{f_{osc}},$$

wherein L is the predetermined factor, fxtal is a first frequency of the crystal oscillator circuit, and fosc is a second frequency of the low power oscillator.

5. The method of claim 1, further comprising powering the low power oscillator with a low power linear dropout regulator.

6. The method of claim 5, further comprising keeping the low power linear dropout regulator on during the active mode.

7. The method of claim 1, further comprising communicating with an external processor using a serial peripheral interface (SPI) interface.

8. The method of claim 1, wherein a first frequency of the crystal oscillator circuit is higher than a second frequency of the low power oscillator.

9. The method of claim 8, wherein the first frequency is about 80 MHz, and the second frequency is about 300 kHz.

10. The method of claim 1, further comprising transmitting a plurality of radiation pulses during the active mode.

11. The method of claim 1, wherein the radar is a millimeter-wave radar.

12. The method of claim 11, wherein the millimeter-wave radar operates as a frequency-modulated continuous wave (FMCW) radar.

13. The method of claim 1, wherein the radiation pulse comprises a linear chirp.

14. The method of claim 1, wherein a duty cycle of active mode operation of the radar is lower than 10%.

15. The method of claim 14, wherein the duty cycle of active mode operation of the radar is about 2%.

16. The method of claim 1, further comprising turning off a clock path associated with the crystal oscillator circuit when turning off the crystal oscillator circuit.

17. A radar comprising:
a crystal oscillator circuit configured to be coupled to an external crystal, the crystal oscillator circuit configured to generate a first clock signal;
a low power oscillator circuit configured to generate a second clock signal;
a multiplexer having a first input coupled to the crystal oscillator circuit, and a second input coupled to the low power oscillator circuit;
a counter having an input coupled to an output of the multiplexer, the counter coupled to the crystal oscillator circuit and to the low power oscillator circuit via the multiplexer; and
a finite state machine configured to:
cause the radar to transmit a radiation pulse during an active mode,
assert a sleep flag after transmitting the radiation pulse,
turn off the crystal oscillator circuit after the sleep flag is asserted,
select the low power oscillator circuit for clocking the counter after the sleep flag is asserted using the multiplexer,
clock the counter with the second clock signal during a low power mode after the sleep flag is asserted,
assert a timer flag when the counter reaches a threshold, and
cause the radar to transition to the active mode when the timer flag is asserted, and
clock the counter with the first clock signal during the active mode.

18. The radar of claim 17, wherein the radar is a millimeter-wave radar operating as a frequency-modulated continuous wave (FMCW) radar.

19. The radar of claim 17, further comprising:
a communication interface configured to be coupled to an external controller; and
a linear dropout regulator configured to provide power to the low power oscillator circuit.

20. A millimeter-wave radar comprising:
a transmitting antenna configured to transmit a chirp during an active mode;
a crystal oscillator circuit configured to be coupled to an external crystal, the crystal oscillator circuit configured to generate a first clock signal having a first frequency;
a low power oscillator circuit configured to generate a second clock signal having a second frequency lower than the first frequency;
a low power regulator configured to provide power to the low power oscillator circuit;
a multiplexer having a first input coupled to the crystal oscillator circuit, and a second input coupled to the low power oscillator circuit;
a counter having an input coupled to an output of the multiplexer; and
a finite state machine configured to:
assert a sleep flag after transmitting the chirp,
turn off the crystal oscillator circuit and a clock path associated with the crystal oscillator circuit after the sleep flag is asserted,
select the low power oscillator circuit for clocking the counter after the sleep flag is asserted using the multiplexer,
clock the counter with the low power oscillator circuit during a low power mode, assert a timer flag when the counter reaches a threshold, and cause the millimeter-wave radar to transition to the active mode when the timer flag is asserted.

21. The millimeter-wave radar of claim 20, further comprising the external crystal coupled to the crystal oscillator circuit.

22. The millimeter-wave radar of claim 20, wherein the finite state machine is further configured to select the crystal oscillator circuit for clocking the counter using the multiplexer and clock the counter with the crystal oscillator circuit during the active mode.

* * * * *